(12) United States Patent
Nakade et al.

(10) Patent No.: US 11,714,486 B2
(45) Date of Patent: Aug. 1, 2023

(54) VIDEO DISPLAY DEVICE AND VIDEO DISPLAY METHOD

(71) Applicant: MAXELL, LTD., Kyoto (JP)

(72) Inventors: Mayumi Nakade, Kyoto (JP); Hitoshi Akiyama, Kyoto (JP); Nobutaka Okuyama, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/788,846

(22) PCT Filed: Dec. 26, 2019

(86) PCT No.: PCT/JP2019/051235
§ 371 (c)(1),
(2) Date: Jun. 24, 2022

(87) PCT Pub. No.: WO2021/130986
PCT Pub. Date: Jul. 1, 2021

(65) Prior Publication Data
US 2023/0044455 A1    Feb. 9, 2023

(51) Int. Cl.
*G06F 3/01* (2006.01)
*G06V 40/20* (2022.01)
(Continued)

(52) U.S. Cl.
CPC .......... *G06F 3/012* (2013.01); *A63B 24/0062* (2013.01); *A63B 71/0622* (2013.01);
(Continued)

(58) Field of Classification Search
CPC ............ A63B 71/0622; A63B 24/0062; A63B 2220/803; A63B 2071/0666; G06V 40/20;
(Continued)

(56) References Cited

U.S. PATENT DOCUMENTS

2012/0092172 A1    4/2012  Wong et al.

FOREIGN PATENT DOCUMENTS

| JP | 2004-236241 A | 8/2004 |
|---|---|---|
| JP | 2005-266170 A | 9/2005 |

(Continued)

OTHER PUBLICATIONS

International Search Report of PCT/JP2019/051235 dated Mar. 24, 2020.

*Primary Examiner* — Abbas I Abdulselam
(74) *Attorney, Agent, or Firm* — Mattingly & Malur, PC

(57) ABSTRACT

A video display device comprising; a display; an exercise amount detection sensor configured to detect an exercise amount of a viewer while the viewer is viewing content displayed and output sensor information; a timer that measures a viewing time; and a processor. The processor: acquires the viewing time from the timer; calculates the exercise amount of the viewer based on the sensor information acquired within a predetermined period of viewing time; compares the exercise amount with an exercise facilitation threshold for determining whether to facilitate exercise for the viewer; displays a specific object within a display area of the display when the exercise amount falls below the exercise facilitation threshold; and moves the specific object from an inside of the display area to an outside thereof in accordance with an external coordinate system expressing a position in a real space associated with a two-dimensional coordinate system in the display area.

11 Claims, 17 Drawing Sheets

(51) Int. Cl.
*A63B 24/00* (2006.01)
*A63B 71/06* (2006.01)
*G09G 3/00* (2006.01)
*G10L 15/22* (2006.01)

(52) U.S. Cl.
CPC ............ *G06V 40/20* (2022.01); *G09G 3/001* (2013.01); *G10L 15/22* (2013.01); *A63B 2071/0666* (2013.01); *A63B 2220/803* (2013.01); *G09G 2340/045* (2013.01); *G09G 2340/0464* (2013.01); *G09G 2354/00* (2013.01)

(58) Field of Classification Search
CPC ..... G09G 2340/0464; G09G 2340/045; G09G 3/001; G10L 15/22
See application file for complete search history.

(56) References Cited

FOREIGN PATENT DOCUMENTS

| | | |
|---|---|---|
| JP | 2009-060465 A | 3/2009 |
| JP | 2014-130204 A | 7/2014 |

FIG. 8

| No. | EXERCISE | SETTING ITEM | SETTING VALUE |
|---|---|---|---|
| 1 | ROTATING | INITIAL POSITION | UPWARD |
| | | ROTATING DIRECTION | RIGHTWARD |
| | | SPEED | 3 |
| | | FREQUENCY | 1 |
| 2 | LATERALLY TURNING | INITIAL POSITION | RIGHTWARD |
| | | SPEED | 3 |
| | | FREQUENCY | 2 |
| 3 | VERTICALLY TURNING | INITIAL POSITION | UPWARD |
| | | SPEED | 3 |
| | | FREQUENCY | 2 |

FIG. 9

| ITEM | | SETTING |
|---|---|---|
| EXERCISE FOR RECOVERY | PATTERN | 1→2→3 |
| | FREQUENCY | 3 |

FIG.11

| No. | EXERCISE | POINT | ACHIEVEMENT DETERMINATION THRESHOLD VALUE |
|---|---|---|---|
| 1 | ROTATING | UPWARD | 50° |
| | | DOWNWARD | 50° |
| | | LEFTWARD | 60° |
| | | RIGHTWARD | 60° |
| 2 | LATERALLY TURNING | RIGHTWARD | 90° |
| | | LEFTWARD | 80° |
| 3 | VERTICALLY TURNING | UPWARD | 60° |
| | | DOWNWARD | 60° |

(a) (b)

(a) (b)

(a)    (b)

(a)    (b)

VIDEO DISPLAY DEVICE AND VIDEO DISPLAY METHOD

TECHNICAL FIELD

The present invention relates to a video display device and a video display method.

BACKGROUND ART

When viewing content on a video display device such as a head mounted display (hereinafter, referred to as "HMD"), a smartphone, a tablet device, and the like, a user may suffer from eyestrain caused by keeping the same posture for a long time. As a technique for eliminating this eyestrain, Patent Literature 1 discloses "a fatigue recovery aiding apparatus comprising an image generation means for generating an image of a prescribed object to be moved reciprocatively in the horizontal direction on a screen of an video display device and a display control means for automatically displaying the image of the object on the screen of the video display device, wherein when a user looking downward follows the image of the object with the eyes, feeling of fatigue of the user can be recovered (excerpted from Abstract)".

Furthermore, Patent Literature 2 describes "an electronic device which urges a viewer of content to blink, comprising a blinking informing means for informing the viewer of a blinking timing while the viewer is viewing the content, and an input operation detecting means for detecting an input operation by the viewer while the viewer is viewing the content, wherein when the input operation detecting means does not detect the input operation by the viewer continuously for more than a first predetermined period of time, the blinking informing means informs the viewer of the blinking timing (excerpted from Abstract)".

CITATION LIST

Patent Literature

Patent Literature 1: JP-A-2005-266170
Patent Literature 2: JP-A-2009-060465

SUMMARY OF INVENTION

Technical Problem

In the above-mentioned Patent Literature 1 and Patent Literature 2, when using the image display apparatus or the electronic device for a long time, the viewer is prompted to do exercise of the eye regardless of a situation of the viewer as a way to reduce eyestrain. However, the viewer feels tired not only in the eyes, but also in a wide part of the body, for example, stiff in the neck and shoulder. Neither Patent Literature 1 nor Patent Literature 2 takes into consideration the reduction of feeling of fatigue that can occur in a wide part of the body, and therefore, problems still remain in terms of the above.

The present invention has been made in order to solve the problem as mentioned above, and thus an object of the present invention is to provide a video display device and a video display method with which an effect of eliminating feeling of fatigue of a viewer, which includes not only the fatigue in the eyes but also the one that can occur in a wide part of the body while the viewer is viewing content on the video display device, can be expected.

Solution to Problem

In order to solve the problems as mentioned above, the present invention includes the technical features described in the scope of claims. As one aspect of the present invention, provided is a video display device comprising; a display; an exercise amount detection sensor configured to detect an amount of exercise of the video display device while content displayed on the display is viewed, and output sensor information; a timer that measures a viewing time of the content; and a processor connected to the display, the exercise amount detection sensor, and the timer, respectively, the processor being configured to: acquire the viewing time from the timer; calculate the amount of exercise of the video display device based on the sensor information acquired within a predetermined period of viewing time; compare the amount of exercise with an exercise facilitation threshold value for determining whether to facilitate an exercise to a viewer; display a specific object within a display area of the display when the amount of exercise is equal to or less than the exercise facilitation threshold value, a display position of the specific object being defined by a coordinate system in which a two-dimensional coordinate system expressing a position of a pixel in the display area of the display is associated with an external coordinate system expressing a position in a real space; and move the display position of the specific object from an inside of the display area to an outside thereof in accordance with the external coordinate system.

Advantageous Effects of Invention

According to the present invention, it is possible to expect an effect of eliminating feeling of fatigue of a viewer, which includes not only the fatigue in the eyes but also the one that can occur in a wide part of the body while the viewer is viewing content on the video display device. The objects, configurations, and advantageous effects other than those described above will be clarified by explanation of the embodiments below.

BRIEF DESCRIPTION OF DRAWINGS

FIG. 8 illustrates an exercise table.
FIG. 9 illustrates an exercise pattern of the determined exercise for recovery from fatigue.

FIG. 11 illustrates an exemplary exercise check list.

DESCRIPTION OF EMBODIMENTS

Hereinafter, embodiments of the present invention will be described with reference to the drawings. Throughout the drawings, the same features are provided with the same reference signs, and repetitive explanation therefor will be omitted.

First Embodiment

Figure 1:
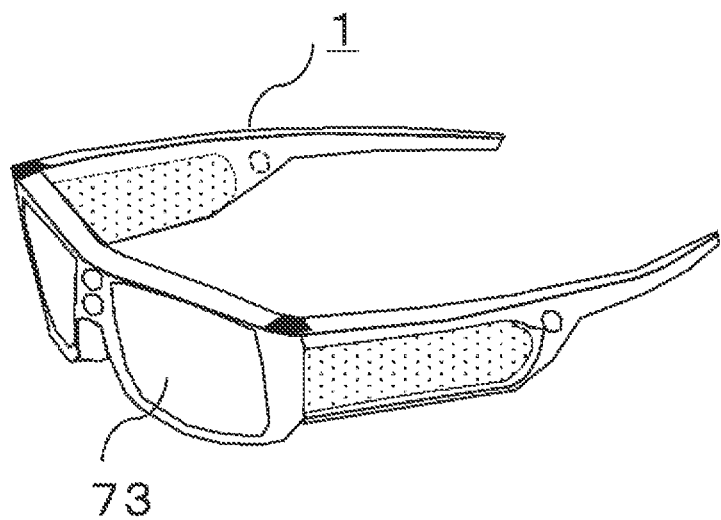
FIG. 1 illustrates an appearance of a head mounted display.

FIG. 1 illustrates an appearance of a head mounted display (HMD) 1 according to the present embodiment. The HMD 1 illustrated in FIG. 1 is a see-through type head mounted display. The HMD 1 includes a transmissive or semi-transmissive display 73. A wearer 2 wearing the HMD 1 (see FIG. 6) is able to see a scene in which a virtual object and video displayed on the display 73 is superimposed on the outside scenery. Although not illustrated, the present embodiment is also applicable to an immersive HMD. The wearer 2 wearing the immersive HMD does not directly see the surrounding scene, but sees a virtual world (virtual reality). Furthermore, the immersive HMD employs a videothrough method, that is, uses data of an external field image captured by an out-camera 72 (see FIG. 2) to see a video in which a virtual object is superimposed on the external field image. Although the present embodiment is applicable to any type described above, in the following, the see-through HMD 1 will be described as an example.

[Example of HMD Hardware Configuration]

Figure 2:
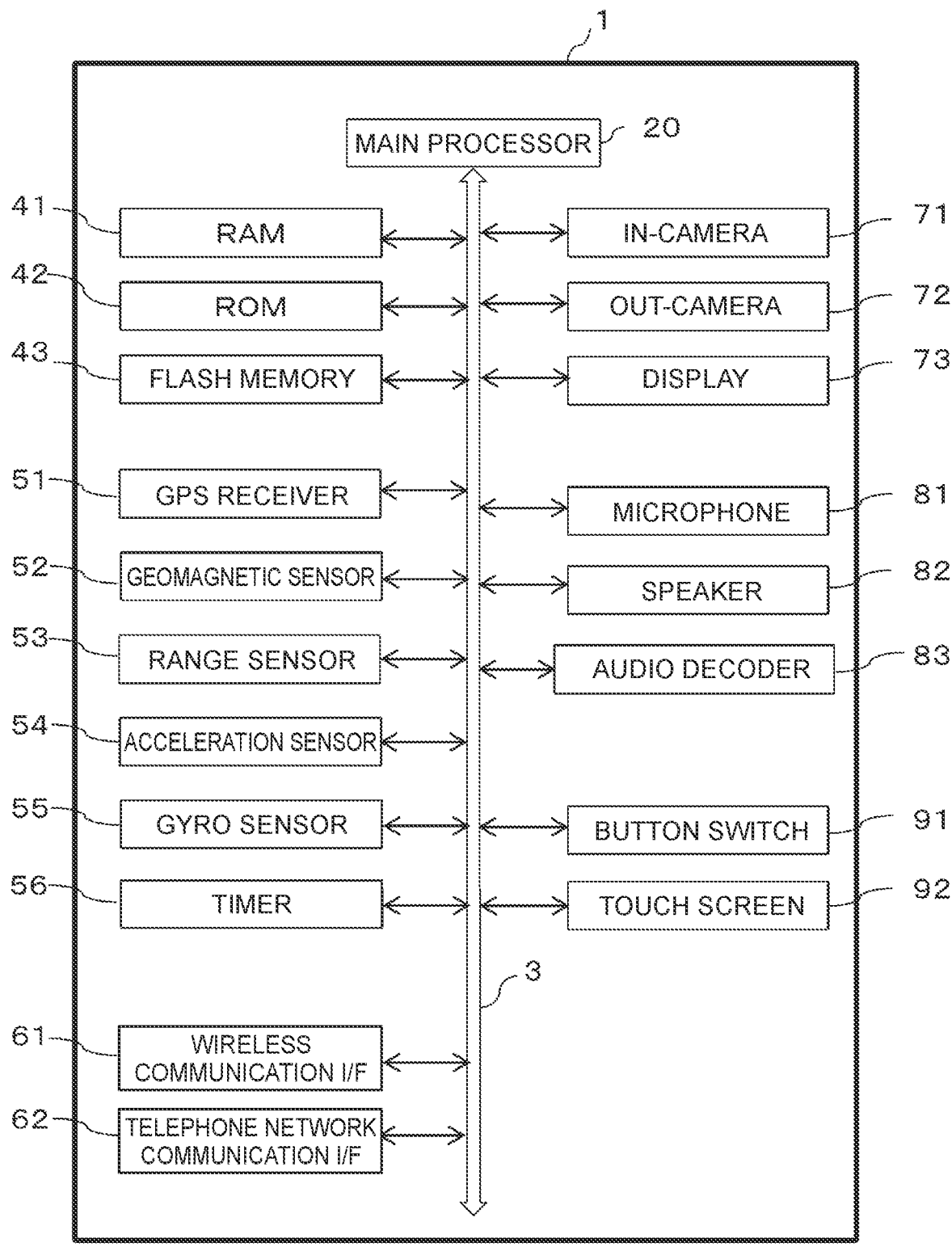
FIG. 2 is a hardware configuration diagram illustrating an exemplary internal configuration of an HMD.

FIG. 2 is a hardware configuration diagram illustrating an exemplary internal configuration of the HMD 1.

The HMD 1 includes a system bus 3, a main processor 20, a RAM 41, a ROM 42, a flash memory 43, a Global Positioning System (GPS) receiver 51, a geomagnetic sensor 52, a range sensor 53, an acceleration sensor 54, a gyro sensor 55, a timer 56, a wireless communication I/F 61, a telephone network communication I/F 62, an in-camera 71, the out-camera 72, a display 73, a microphone 81, a speaker 82, an audio decoder 83, a button switch 91, and a touch screen 92. These components are connected to the system bus 3.

The main processor 20 controls the entire operations of the HMD 1 in accordance with predetermined operation programs. The main processor 20 may be configured with any component such as a CPU, an MPU, or a dedicated logic circuitry.

The system bus 3 is a data communication channel that interconnects the main processor 20 with the respective components in the HMD 1. The main processor 20 and the components in the HMD 1 transmit and receive various commands, data, and the like through the system bus 3.

The RAM 41 defines a rewritable program work area, which is, for example, used by the main processor 20 at the time of execution of various programs.

Each of the ROM 42 and the flash memory 43 retains various programs for implementing the functions of the HMD 1, operation setting values, sensor information including values detected by sensors which will be described later, and various data for display such as virtual objects and content. The ROM 42 and flash memory 43 are so-called nonvolatile storages that retain stored data even when power is not supplied to the HMD 1 from the outside.

The flash memory 43 retains operation programs downloaded from a network and various data created by the operation programs. Through download processing from each server device on the network, it is possible to update and enhance each operation program stored in the flash memory 43.

Furthermore, the flash memory 43 can retain content such as moving images, still images, and audio data downloaded from a network. In addition, the flash memory 43 can retain data such as moving images and still images captured by the in-camera 71 or the out-camera 72.

The RAM 41, the ROM 42, and the flash memory 43 are examples of storages. Other devices, for example, a semiconductor memory element such as a solid state drive (SSD) or a magnetic disk drive such a hard disc drive (HDD) may be used therefor.

The main processor 20 is configured to acquire sensor information from the GPS receiver 51, the geomagnetic sensor 52, the range sensor 53, the acceleration sensor 54, and the gyro sensor 55, respectively, and also acquire a viewing time measured by the timer 56. Then, the main processor 20 uses the sensor information and the viewing time to detect the position, tilt, direction, movement, and the like of the HMD 1. Furthermore, the HMD 1 may further include other sensors, such as an illuminance sensor, a proximity sensor, an altitude sensor, and the like.

The wireless communication I/F 61 is connected to a network such as the Internet through a wireless access point and the like, and transmits and receives data to and from each server on the network. The wireless communication I/F 61 may be connected to the wireless access point and the like via, for example, Wi-Fi (registered trademark) or BlueTooth (registered trademark).

The telephone network communication I/F 62 is connected to a communication network through a base station using a mobile communication network to transmit and receive data to and from a server on a communication network according to the third-generation mobile communication system (hereinafter, referred to as "3G") such as Global System for Mobile Communications (GSM, registered trademark), Wideband Code Division Multiple Access (W-CDMA), CDMA 2000, or Universal Mobile Telecommunications System (UMTS). Similarly, the telephone network communication I/F 62 is connected to the communication network according to the Long Term Evolution system (LTE), or a communication method such as so-called the fourth generation system (4G) or fifth generation system (5G).

Each of the wireless communication I/F 61 and telephone network communication I/F 62 includes an encoding circuitry, a decoding circuitry, an antenna, and the like.

Furthermore, the HMD 1 may include other communication interfaces such as an infrared communication I/F.

Each of the in-camera 71 and the out-camera 72 converts the light received through a lens into an electric signal using an electronic device such as a charge coupled device (CCD) or a complementary metal oxide semiconductor (CMOS) sensor to input image data of the surroundings and that of an object.

The display 73 is, for example, a display device such as a liquid crystal panel, and provides the wearer 2 of the HMD 1 with image data. The HMD 1 includes a video RAM (not illustrated). A virtual object or video is displayed on the screen of the display 73 based on the image data received by the video RAM.

The microphone 81 converts the voice of the wearer 2 into audio data and inputs the audio data.

The speaker 82 outputs sound and the like.

The audio decoder 83 performs decoding processing of an encoded audio signal as necessary.

Each of the button switch 91 and touch screen 92 is an operation device used to input an operation instruction to the HMD 1. The operation device is not limited to the button switch 91 and the touch screen 92. For example, an operation signal to the HMD 1 may be transmitted from a separate portable device (for example, a smartphone or a tablet device) connected thereto by wired communication or wireless communication. Upon receiving the operation signal, the HMD 1 is operated in accordance with the received operation signal. Alternatively, based on the audio data converted by the microphone 81, the main processor 20 may execute sound recognition processing to generate an operation signal to control the operation of the HMD 1.

A part of the exemplary configuration of the HMD 1 illustrated in FIG. 2 is not essential to the present embodiment. Accordingly, even if the configuration of the HMD 1 does not include such an unessential component, the advantageous effects of the present embodiment are not impaired. In this connection, the configuration of the HMD 1 may further include components which are not illustrated, for example, a digital broadcast reception function and an electronic money settlement function.

[Functional Block of HMD 1]

Figure 3:
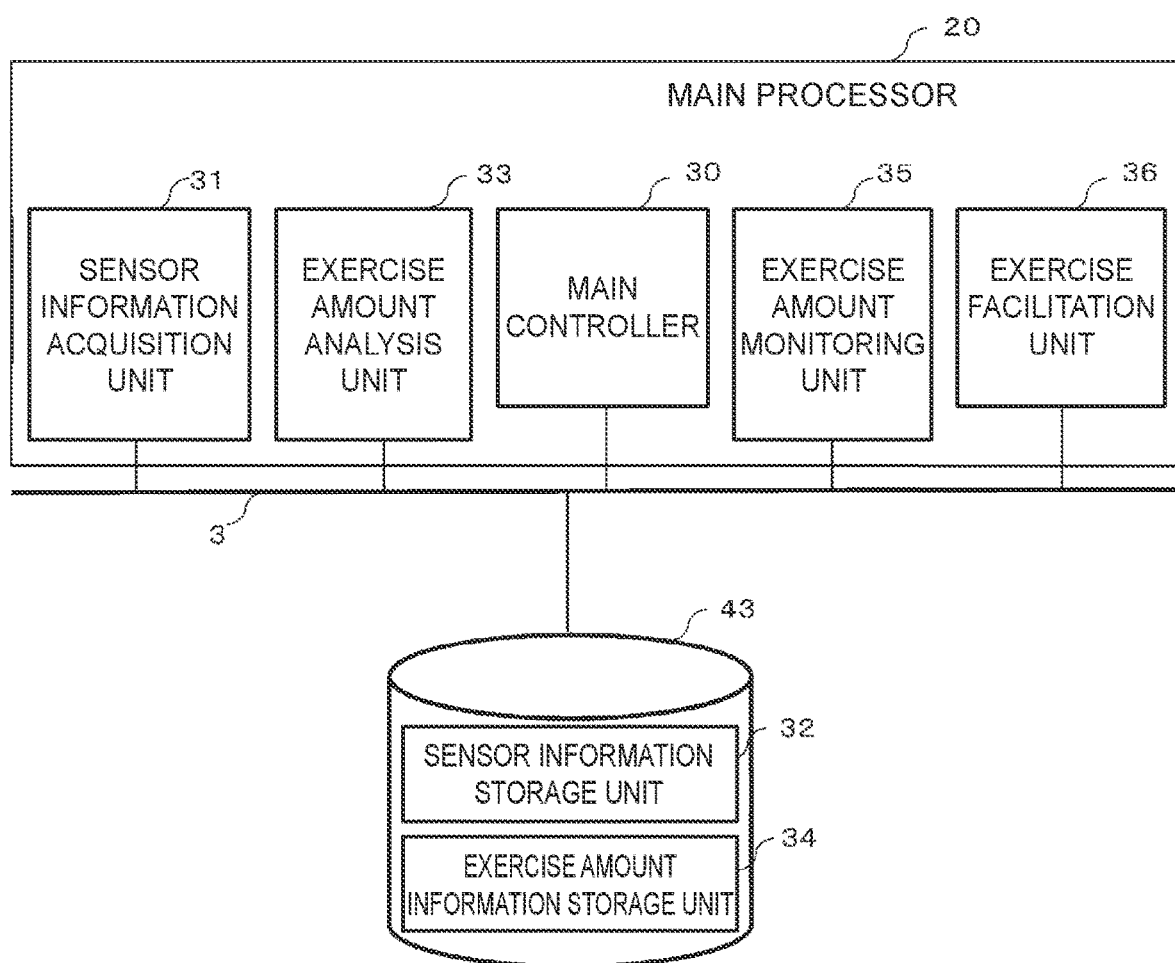
FIG. 3 is a block diagram illustrating an exemplary functional block configuration of an HMD.

FIG. 3 is a block diagram illustrating an exemplary functional block configuration of the HMD 1. The main processor 20 loads a program stored in the ROM 42 or the flash memory 43 onto the RAM 41 and executes the program, whereby each functional block unit illustrated in FIG. 3 is implemented.

A main controller 30 controls the operations of the HMD 1.

A sensor information acquisition unit 31 is configured to acquire sensor information from each of the GPS receiver 51, the geomagnetic sensor 52, the range sensor 53, the acceleration sensor 54, and the gyro sensor 55. The sensor information acquisition unit 31 stores the acquired sensor information in a sensor information storage unit 32 configured with a work area of the storage (for example, the flash memory 43). The sensor information acquisition unit 31 is also configured to acquire a viewing time measured by the timer 56, and thus an exercise amount analysis unit 33 and an exercise amount monitoring unit 35 can refer to the viewing time.

The exercise amount analysis unit 33 is configured to read the sensor information for each predetermined period of time stored in the sensor information storage unit 32, and analyze the movement amount, movement speed, and movement direction of the wearer 2 to generate the amount of exercise information. The exercise amount analysis unit 33 stores the amount of exercise information in an exercise amount information storage unit 34 configured with a work area of the storage (for example, the flash memory 43).

The exercise amount monitoring unit 35 is configured to read the amount of exercise information stored in the exercise amount information storage unit 34, and accumulate the amount of exercise information for a set time. Then, the exercise amount monitoring unit 35 monitors an exercise condition of the wearer 2 of the HMD 1 based on the cumulative values.

The exercise facilitation unit 36 is configured to control display of images for facilitating the wearer 2 of the HMD 1 to do the exercise based on the values accumulated by the exercise amount monitoring unit 35.

[Processing Mode of HMD 1]

Figure 4:
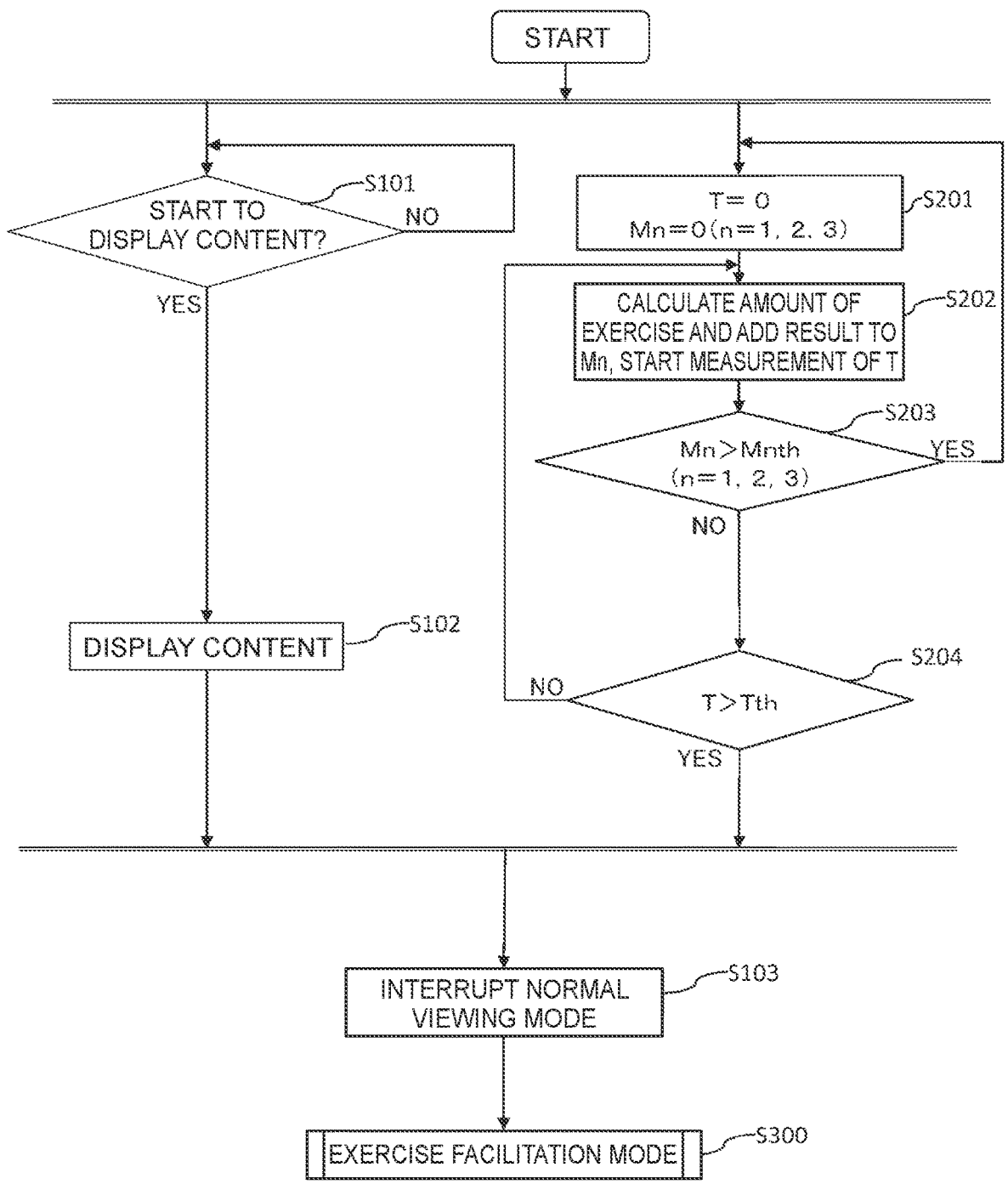
FIG. 4 is a flowchart illustrating an entire processing flow of an HMD.

FIG. 4 is a flowchart illustrating an entire processing flow of the HMD 1.

The processing of the HMD 1 is roughly divided into a normal viewing mode, an exercise amount monitoring mode, and an exercise facilitation mode following the exercise amount monitoring mode. The normal viewing mode is a mode in which the wearer 2 of the HMD 1 can freely operate the HMD 1 to enjoy the content and applications. The exercise amount monitoring mode is a mode for monitoring the amount of exercise of the head of the wearer 2 of the HMD 1 during the normal viewing mode so as to cause mode shift to the exercise facilitation mode. The exercise facilitation mode is a mode for facilitating an exercise for recovery from fatigue to eliminate feeling of fatigue as needed. When the main power is turned on, the HMD 1 executes the normal viewing mode and the exercise amount monitoring mode in parallel.

[Normal Viewing Mode]

As a normal viewing mode, for example, content display processing will be described as an example. The main processor 20 of the HMD 1 stands by until it receives a content display start instruction from the button switch 91 or the touch screen 92 (step S101: NO). Upon receiving input of the content display start instruction (step S101: YES), the main processor 20 starts the content display processing (step S102).

[Exercise Amount Monitoring Mode]

The main controller 30 resets the timer 56 for measuring a viewing time T of the content to 0, and also resets values of cumulative amount of exercise M1, M2, M3 to 0 (step S201). In the present embodiment, as the amount of exercise of the head of the wearer 2 of the HMD 1 (see FIG. 6), the amount of rotational, parallel, and vertical movement of the head is measured. Accordingly, as the sensor information for measuring the amount of exercise of the head of the wearer of the HMD 1, in particular, the geomagnetic sensor 52, the acceleration sensor 54, and the gyro sensor 55 are used. A first cumulative amount of exercise M1 represents a cumulative value of the sensor information from the geomagnetic sensor 52, a second cumulative amount of exercise M2 represents a cumulative value of the sensor information from the acceleration sensor 54, and a third cumulative amount of exercise M3 represents a cumulative value of the sensor information from the gyro sensor 55.

The sensor information acquisition unit 31 acquires the sensor information from the GPS receiver 51, the geomagnetic sensor 52, the range sensor 53, the acceleration sensor 54, and the gyro sensor 55, and stores the acquired information in the sensor information storage unit 32. In addition, the timer 56 starts to measure the viewing time T (step S202).

The exercise amount analysis unit 33 reads, from the sensor information storage unit 32, the sensor information from the geomagnetic sensor 52, that from the acceleration sensor 54, and that from the gyro sensor 55, calculates M1, M2, M3, respectively, and stores the calculation results as the amount of exercise information in the exercise amount information storage unit 34.

The exercise amount monitoring unit 35 reads, from the storage, a first lower limit of amount of exercise (M1$th$), a second lower limit of amount of exercise (M2$th$), and a third lower limit of amount of exercise (M3$th$), which are preset for M1, M2, M3, respectively. The exercise amount monitoring unit 35 also reads M1, M2, M3 from the exercise amount information storage unit 34. Then, the exercise amount monitoring unit 35 executes determination processing with the following equations (1) to (3) (step S203).

$$M1 > M1th \qquad (1)$$

$$M2 > M2th \qquad (2)$$

$$M3 > M3th \qquad (3)$$

In the case where at least one of the determination results of the equations (1) to (3) is positive (step S203: YES), the processing returns to step S201. In this case, it is estimated that the head of the wearer of the HMD 1 is not so motionless as to require exercise facilitation.

On the other hand, in the case where all the determination results of the equations (1) to (3) are negative (step S203: NO), the processing moves to step S204. In this case, it is estimated that the amount of exercise of the head of the wearer 2 of the HMD 1 is so small that the exercise facilitation is necessary.

The exercise amount monitoring unit 35 further executes the determination processing with the following equation (4) using the viewing time T and a preset allowable time threshold value Tth (step S204).

$$T > Tth \qquad (4)$$

In the case where the determination result of the equation (4) is negative (step S204: NO), the processing returns to step S202. In this case, it is estimated that the amount of exercise of the head of the wearer 2 of the HMD 1 is so small that the exercise facilitation is necessary, however, since the small amount of exercise state does not exceed the allowable time threshold value Tth, it is determined that the exercise facilitation is not currently required.

On the other hand, in the case where the determination result of the equation (4) is positive (step S204: YES), the normal viewing mode is interrupted (step S103), and the mode is shifted to the exercise facilitation mode (step S300). In this case, the state in which the amount of exercise of the head of the wearer 2 of the HMD 1 is small continues for a long time, and accordingly, it is estimated that doing the exercise should be facilitated to the wearer 2 of the HMD 1.

[Exercise Facilitation Mode]

Figure 5:
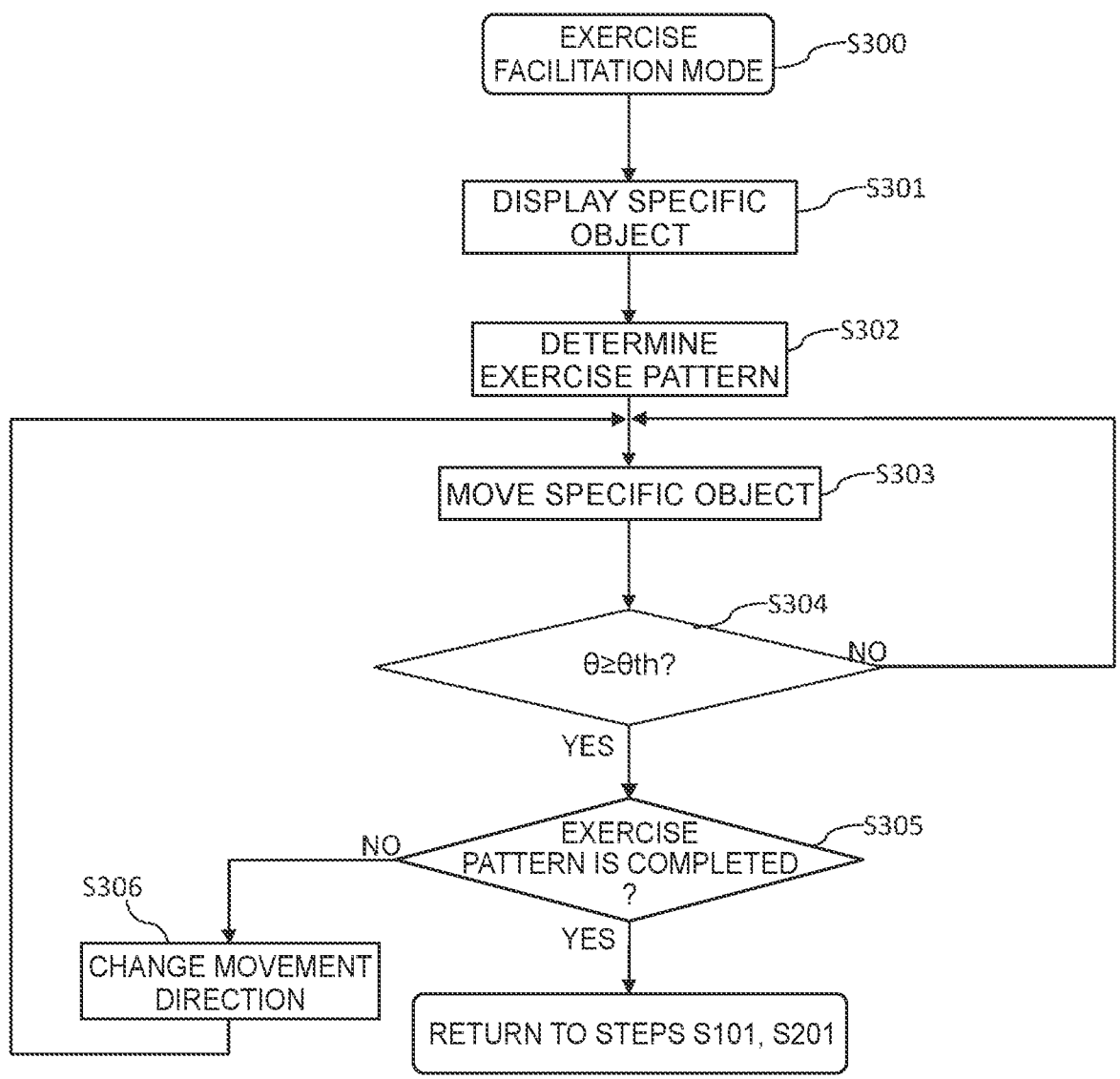
FIG. 5 is a flowchart illustrating a processing flow of an exercise facilitation mode.

FIG. 5 is a flowchart illustrating a processing flow of the exercise facilitation mode.

The exercise facilitation unit 36 is configured to display an object (hereinafter, referred to as a "specific object") to be used in the exercise for recovery from fatigue on a display area 100 of the display 73 (step S301).

Figure 6:
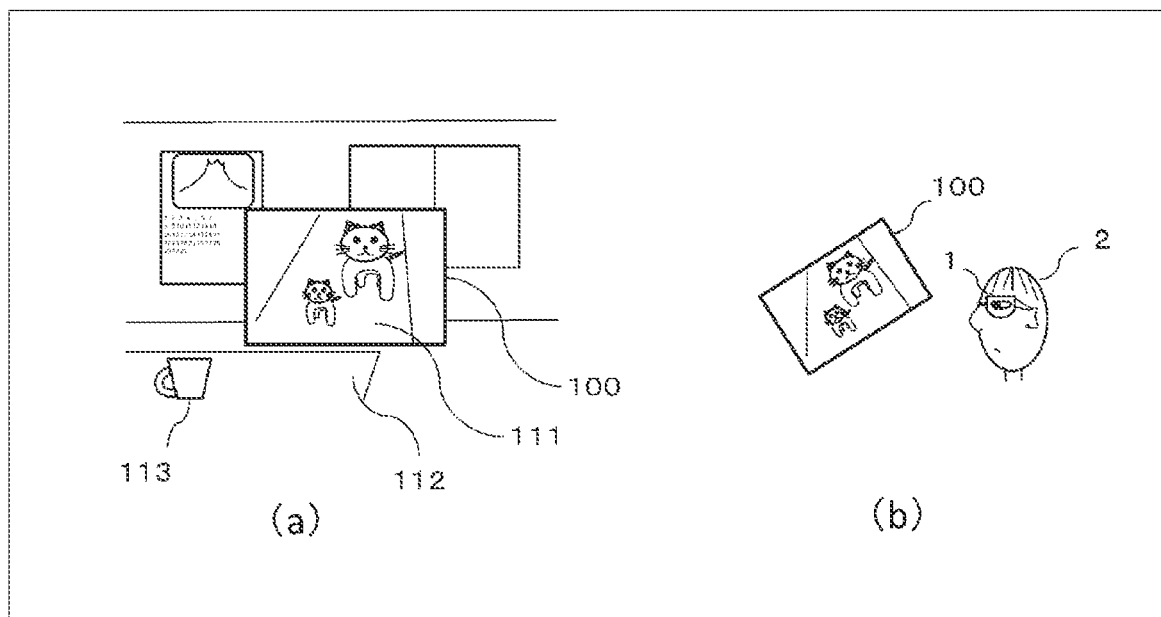
FIG. 6 illustrates a viewing state in a normal viewing mode.

FIG. 6 illustrates a viewing state in the normal viewing mode.

FIG. 6($a$) illustrates a scene in which the wearer 2 of the HMD 1 is viewing in the normal viewing mode. In the normal viewing mode, content 111 is displayed on the display area 100 of the display 73. The wearer 2 views the content 111 which is superimposed on the real scenery.

FIG. 6($b$) illustrates the relation between a position of the wearer 2 in the three-dimensional space of the real space and a position at which the content 111 is virtually viewed. The content 111 to be displayed in the normal viewing mode is the content that the wearer 2 wishes to view even while he or she is in motion, and thus it is displayed at a fixed position with respect to the display area 100.

Furthermore, if the content 111 is virtually arranged in the three-dimensional space of the real space, the virtual object is arranged and fixed with respect to the three-dimensional coordinates in the real space. For example, the wearer 2 can view a virtual object 113 of a cup fixed to a table 112 only when the wearer 2 moves the head and the virtual object 113 is on the extension of the display area 100 and the line of sight of the wearer 2. Thus, in FIG. 6, the wearer 2 cannot view the virtual object 113.

Figure 7:
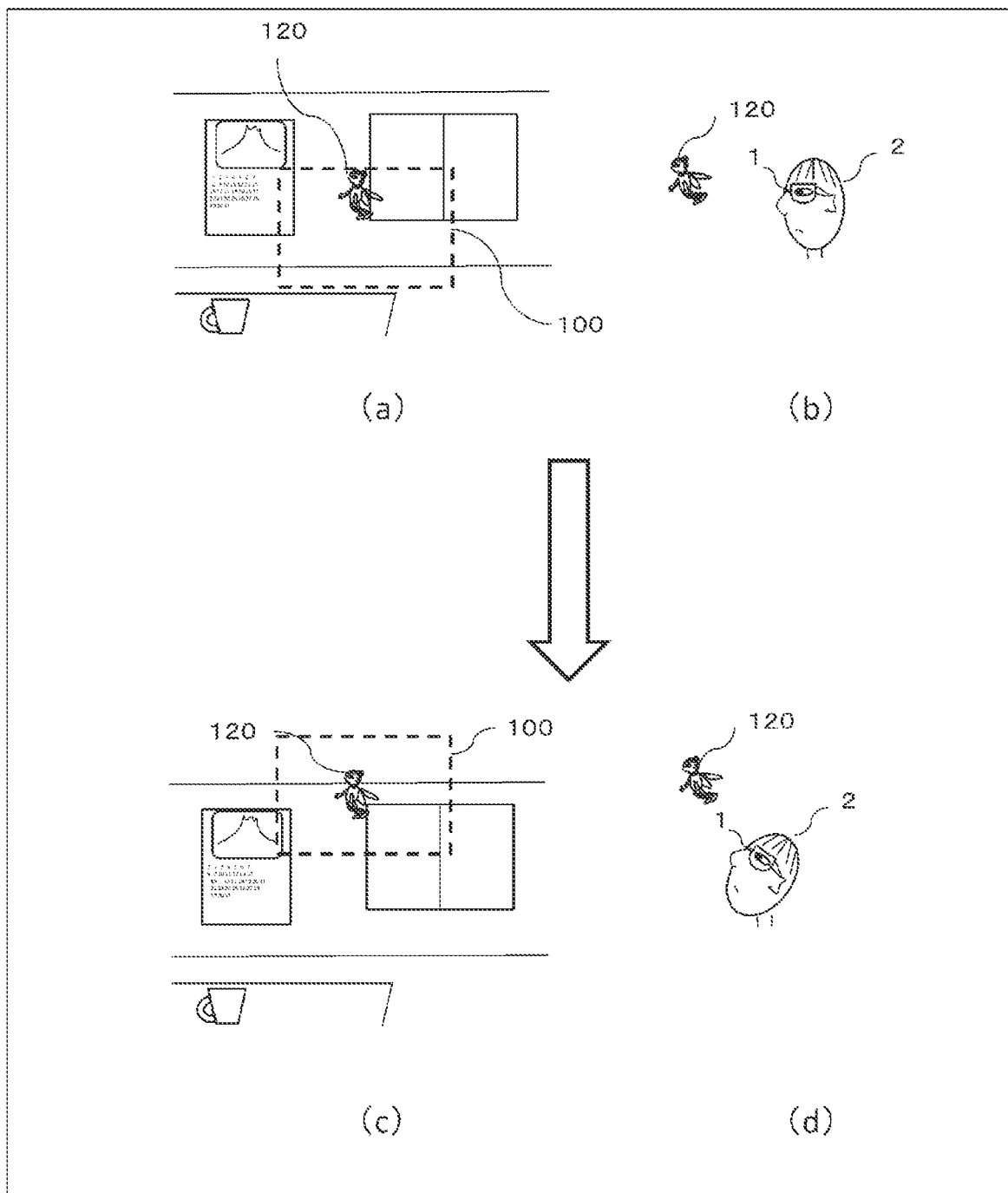
FIG. 7 illustrates a viewing state in an exercise facilitation mode.

FIG. 7 illustrates a viewing state in the exercise facilitation mode.

The exercise facilitation unit 36 is configured to display the specific object 120 within the display area 100 of the display 73 (FIG. 7($a$)). FIG. 7($b$) illustrates the relation between a position of the wearer 2 in the three-dimensional space of the real space and a position at which the specific object 120 is virtually viewed. Note that the position and angle of the head of the wearer 2 in FIG. 7($b$) shall not change from the position and angle of the head of the wearer 2 in FIG. 6($b$).

In the following, FIG. 5 will be referred to again. The exercise facilitation unit 36 refers to an exercise list illustrated in FIG. 8, and determines an exercise pattern to be use in the exercise for recovery from fatigue, which is to be facilitated to the wearer 2 (step S302).

FIG. 8 illustrates an exercise table. In the exercise table, as the types of exercise of the head, a rotating exercise, a laterally turning exercise, and a vertically turning exercise are registered. Furthermore, in the exercise table, a direction toward which the wearer 2 is made to turn initially, a direction of rotating, the speed, and the frequency of exercise are set. Here, an example in which the speed is set to an intermediate speed level in the case where the speed can be set in five levels is described.

There are several algorithms used by the exercise facilitation unit 36 to determine the exercise for recovery from fatigue. For example, the algorithm to be used may be determined, as a result of the equations (1) to (3), so as to interpolate the amount of exercise that is equal to or less than an exercise facilitation threshold value. More specifically, the exercise facilitation unit 36 analyzes the values of M1, M2, M3, and calculates the direction and amount of exercise of the head of the wearer 2. Then, the type, order, and frequency of exercise to be used in the exercise for recovery from fatigue may be determined in order from the exercise direction with the small amount of exercise.

FIG. 9 illustrates an exercise pattern of the determined exercise for recovery from fatigue. In the exercise for recovery from fatigue, the type of exercise selected from the exercises registered in FIG. 8, order, and frequency of times to be done are defined.

The exercise facilitation unit 36 moves a display position of the specific object 120 within the display area 100 in accordance with the exercise pattern defined in the exercise for recovery (step S303).

Figure 10:
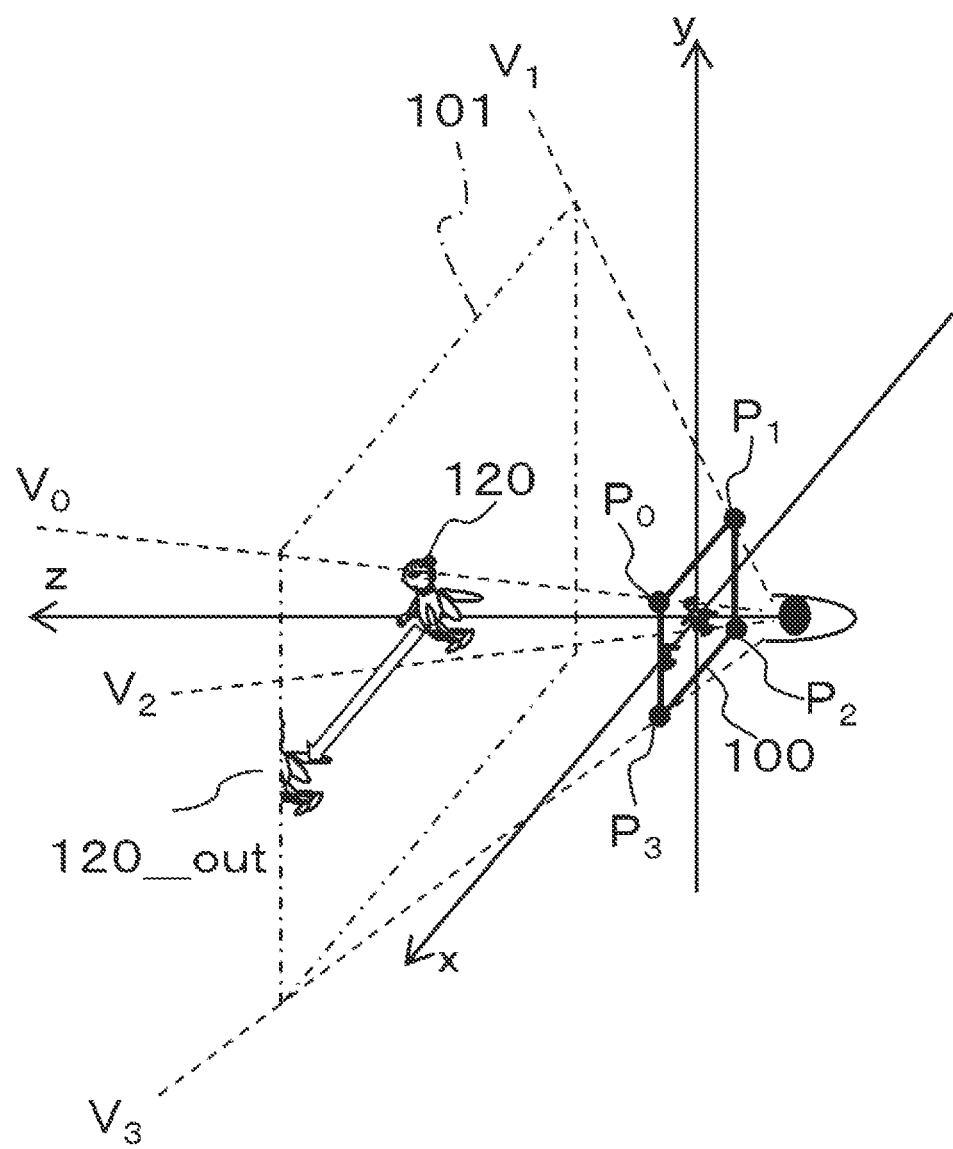
FIG. 10 illustrates the correspondence between an external coordinate system defining a display position of a specific object and a two-dimensional coordinate system of a display area.

FIG. 10 illustrates the correspondence between an external coordinate system defining a display position of the specific object 120 and a two-dimensional coordinate system of the display area 100.

The exercise facilitation unit 36 acquires the current position of the HMD 1 from the GPS receiver 51. This current position is defined in a GPS coordinate system, that is, a three-dimensional coordinate system of the real world, and is referred to as an external coordinate system in the present description. In this connection, in the case where the accurate current position cannot be obtained by the GPS receiver 51, for example, while the user is indoors, the current position may be obtained by adding a travel distance calculated based on the information such as from the acceleration sensor 54 mounted on the HMD 1 to the point where the accurate current position acquired by the GPS receiver 51 was recorded. Furthermore, the position of the HMD 1 at the time of being activated may be processed as the origin of the external coordinate system, and then be corrected after the accurate current position is acquired by the GPS receiver 51. In the following, FIG. 10 illustrates a display example of the one eye for the purpose of explanation. On the other hand, in the case of three-dimensional display by both the eyes, the specific object 120 in the three-dimensional coordinate system of the real world is converted into a display area of each eye and then displayed.

The exercise facilitation unit 36 generates calibration data for converting the two-dimensional coordinate system (st-coordinate system) of the display area 100 into the external coordinate system (xyz-coordinate system) by making pixels P0, P1, P2, P3 within the display area 100 associated with a coordinate system in which the two-dimensional coordinate system within the display area 100 is associated with the external coordinate system expressing a position in the real space.

P0: $(s_0, t_0)$ $(x_0, y_0, z_0)$
P1: $(s_1, t_0)$ $(x_1, y_0, z_0)$
P2: $(s_0, t_2)$ $(x_0, y_0, z_0)$
P3: $(s_1, t_2)$ $(x_1, y_2, z_0)$

The exercise facilitation unit 36 moves the display position of the specific object 120 along the external coordinate system. At this time, the exercise facilitation unit 36 converts the coordinates of the display position of the specific object 120 in the external coordinate system into the two-dimensional coordinates of the display area 100 using the calibration, whereby the specific object can be displayed at a desired position in the external coordinate system.

Alternatively, the exercise facilitation unit 36 may be configured to display the specific object 120 on the display 73 in the case where the display position of the specific object 120 expressed by the external coordinate system is on the normal vector V of a surface including the display area 100, which passes through pixels of the display area 100. In this case, when the display position of the specific object 120 is not on the normal vector V of any point in the two-dimensional coordinate system, the specific object 120 is not displayed on the display.

The exercise facilitation unit 36 applies the coordinates of P0, P1, P2, P3 in the external coordinate system to the following equation (5) to obtain the equation defined in the external coordinate system of the surface including the display area 100.

$$ax+by+cz=d \quad (5)$$

Thereafter, the exercise facilitation unit 36 obtains, based on the equation (5), normal vectors V0, V1, V2, V3 of the surface including the display area 100, which pass through the points P0, P1, P2, P3, respectively. The case where the specific object 120 is in a three-dimensional space 101 surrounded by V0, V1, V2, V3 means that the specific object 120 is present on the line of sight of the wearer 2 which passes through the display area 100, and accordingly, the exercise facilitation unit 36 causes the specific object 120 to be displayed in the display area 100 in order to allow the wearer 2 to see it.

As illustrated in FIG. 10, when the specific object 120 is moved from the inside of the display area 100 toward the outside in the left direction of FIG. 10 and thus deviates from the three-dimensional space 101, the wearer 2 cannot see the specific object 120. Thus, when the exercise facilitation unit 36 moves the display position of the specific object 120 along the external coordinate system, with the result that the specific object 120 starts to deviate from the inside of the three-dimensional space 101, as indicated by the specific object 120_out, the specific object 120 becomes gradually invisible within the display area 100 starting from a portion that has deviated from the three-dimensional space 101. That is, in the case where pixels that correspond to the coordinates of the display position of the specific object 120 in the external coordinate system are present within the display area 100, the exercise facilitation unit 36 causes the specific object 120 to be displayed on the pixels, and in the case where no pixels that correspond to the coordinates of the display position of the specific object 120 in the external coordinate system are present within the display area 100, the exercise facilitation unit 36 does not cause the specific object 120 to be displayed on the display 75.

FIG. 7(c) illustrates a state in which the specific object 120 is moved further upward than that in FIG. 7(a). In FIG. 7(d), the wearer 2 moves the head in an elevation direction (namely, doing the exercise for head) and accordingly, the display area 100 of the HMD 1 also moves relative to the real space. Thus, the wearer 2 is looking up at the specific object 120.

The exercise facilitation unit 36 determines whether the inclination angle (for example, elevation angle) θ of the head of the wearer 2 is equal to or more than a predetermined achievement determination threshold value θth based on the following equation (6) (step S304).

$$\theta \geq \theta th \quad (6)$$

FIG. 11 illustrates an example of an exercise check list. In the exercise check list, the achievement determination threshold value θth used to determine whether the exercise has been achieved in view of the angle of the head is defined for each point of each exercise.

If the equation (6) is negative (step S304: NO), the processing returns to step S303, and the exercise facilitation unit 36 continues moving the specific object. If the equation (6) is positive (step S304: YES), it can be estimated that the exercise has been done, and thus the exercise facilitation unit 36 ends the subsequent exercise or the exercise for recovery from fatigue per se. If all of the exercise patterns and frequency of times defined in FIG. 9 are not completed (step S305: NO), the exercise facilitation unit 36 selects the subsequent movement direction (namely, changes the movement direction) (step S306), and moves the specific object 120 toward the movement direction that has been selected (step S303). In the above, a display example for making the wearer 2 face upward has been described, and similarly, the exercise facilitation unit 36 can prompt the wearer 2 to move the head by moving the specific object 120 downward, leftward, or rightward.

On the other hand, if all the exercise patterns and frequency of times of the exercise for recovery from fatigue which has been determined in FIG. 9 are completed (step S305: YES), the exercise facilitation unit 36 finishes the exercise for recovery from fatigue. The main processor 20 restarts the normal viewing mode (step S101), and also restarts the exercise amount monitoring mode (step S201).

According to the present embodiment, while the wearer 2 is viewing the content 111 in the normal viewing mode, the amount of exercise of the head of the wearer 2 is monitored, and if the state in which the amount of exercise is small exceeds the allowable time threshold value Tth, the mode is shifted to the exercise facilitation mode. Then, moving the display position of the specific object 120 forcibly, that is, regardless of the operation instruction from the wearer 2 causes the wearer 2 to track the specific object 120 with the eyes, thereby generating the movement of the head of the wearer 2. Furthermore, by checking the amount of exercise of the head of the wearer 2 about, whether the exercise for recovery from fatigue is properly achieved can be confirmed. As a result, when the wearer 2 concentrates on viewing the content 111 of the HMD 1 and thus the amount of exercise of the head decreases, it is possible to facilitate the exercise of the head and neck more effectively.

Second Embodiment

[Immersive HMD Image]

Figure 12:
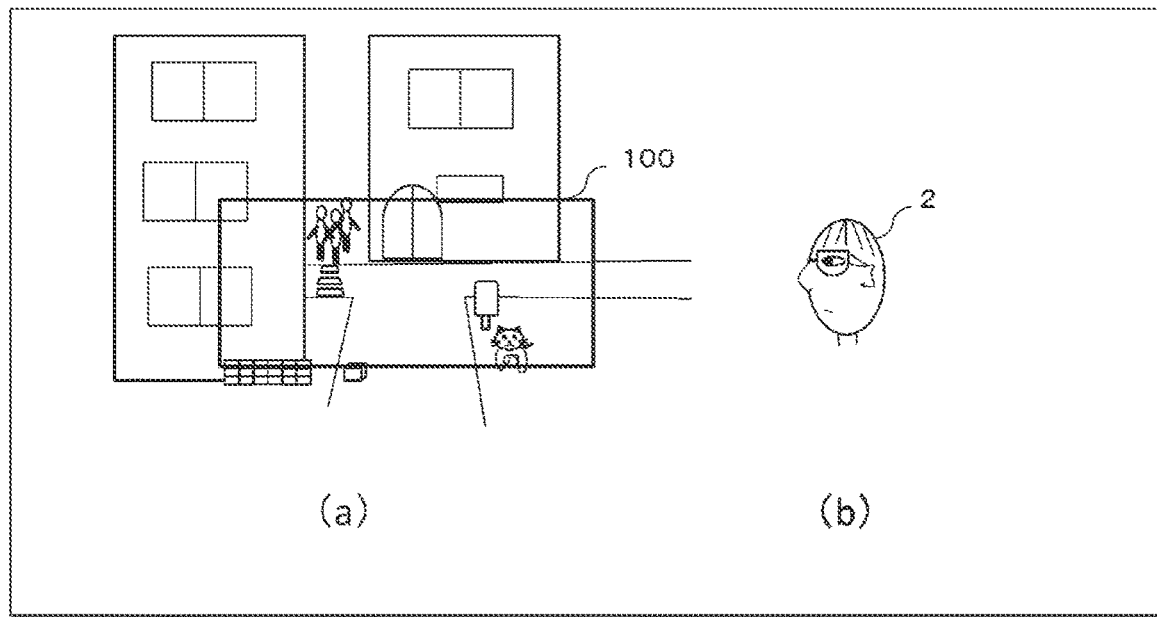
FIG. 12 illustrates a state in which a wearer is viewing a video with an immersive HMD.
Figure 13:
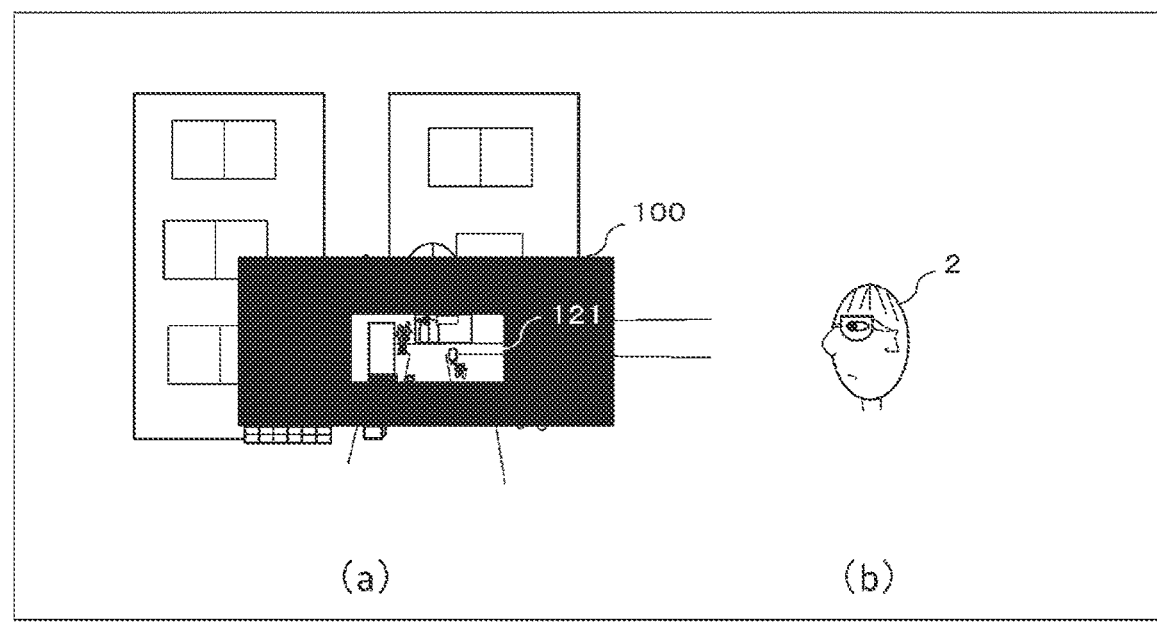
FIG. 13 illustrates a state in which a wearer is viewing a video with an immersive HMD.

Each FIG. 12 and FIG. 13 illustrates a state in which the wearer 2 is viewing a video with the immersive HMD 1. In the case of the immersive HMD 1, the wearer 2 sees a scenery in the real world in which an external image captured by the out-camera 72 is displayed within the display area 100 of the display 73. Furthermore, the wearer 2 can see a virtual object and content superimposed on the external image. FIG. 12(a) illustrates a situation in which the wearer 2 is viewing the external image showing a partial area of the real world captured by the out-camera 72, which is displayed within the display area 100. FIG. 12(b) illustrates an example of the posture of the head of the wearer 2 who is seeing the video of FIG. 12(a).

The difference between the first embodiment and the second embodiment is that, while the first embodiment uses a virtual object as the specific object 120, the second embodiment does not use a virtual object as a specific object but uses an object in which an external image is reduced and displayed as a specific object 121 (see FIG. 13(a)).

When the mode is shifted to the exercise facilitation mode, the exercise facilitation unit 36 generates the specific object 121 by gradually reducing, from the size corresponding to the size of the display area 100, an image obtained immediately before the shifting to the exercise facilitation mode. Then, in the same manner as the first embodiment, the exercise facilitation unit 36 moves the specific object 121. The specific object 121 may be a reduced image of the content displayed in the normal viewing mode, or may be a reduced image of an external image when the content is not displayed in the normal viewing mode and only the external image is being displayed.

The exercise facilitation unit 36 darkens a peripheral portion (background area) of the specific object 121 in order to provide a luminance difference between the specific object 121 and the peripheral portion. In the case where the image of the specific object 121 is dark, the luminance difference therebetween may be provided by gradually increasing the brightness of the entire of the specific object 121 while reducing the size thereof, thereby allowing the wearer 2 to recognize the specific object 121 more easily.

Using the image obtained by reducing the immediately preceding external image as the specific object 121 enables the wearer 2 to do the exercise for recovery from fatigue without interrupting viewing of the content or the external image.

Third Embodiment

In the exercise for recovery from fatigue, the exercise facilitation unit 36 moves the specific objects 120, 121 toward the outside of the display area 100. This may cause the wearer 2 to fail to follow the movement of the specific objects 120, 121 and thus lose track thereof. In the third embodiment, guidance is provided in the case where the wearer 2 loses track of the specific objects 120, 121. In the following, the case using the specific object 120 will be described as an example.

Figure 14:
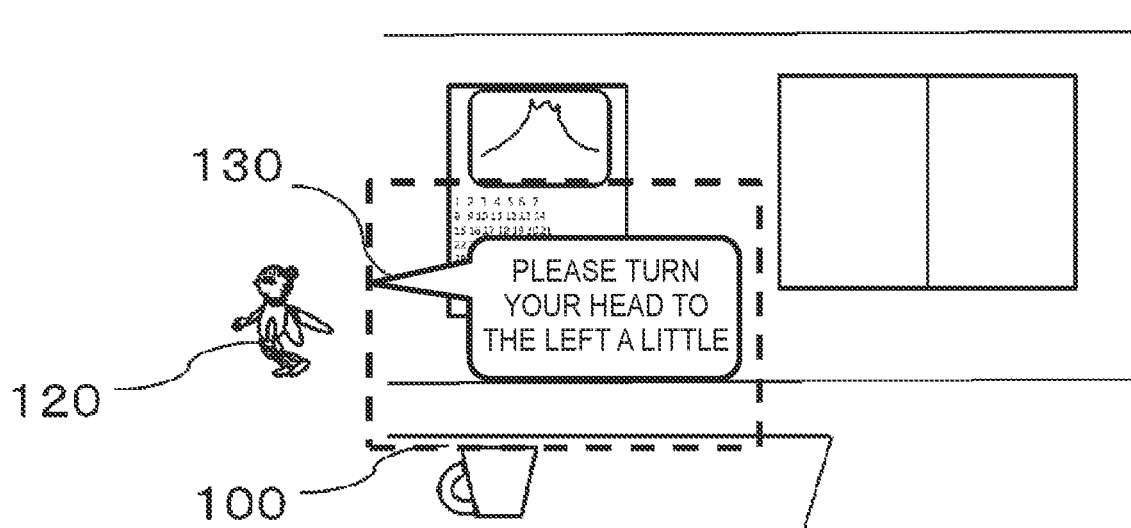
FIG. 14 illustrates a viewing state in the third embodiment.
Figure 14:

FIG. 14 illustrates a viewing state in the third embodiment. In FIG. 14, the specific object 120 is not inside the display area 100, which corresponds to a state in which the specific object 120 is located outside the three-dimensional space 101 surrounded by V0, V1, V2, V3 in FIG. 10. This state makes the wearer 2 unsure which direction, namely, left, right, front, or rear, to face in order to view the specific object 120.

In this regard, the exercise facilitation unit 36 is configured to, when determining that the specific object 120 deviates from the display area 100, perform processing to notify the wearer 2 of the direction in which the specific object 120 is present.

Figure 15:
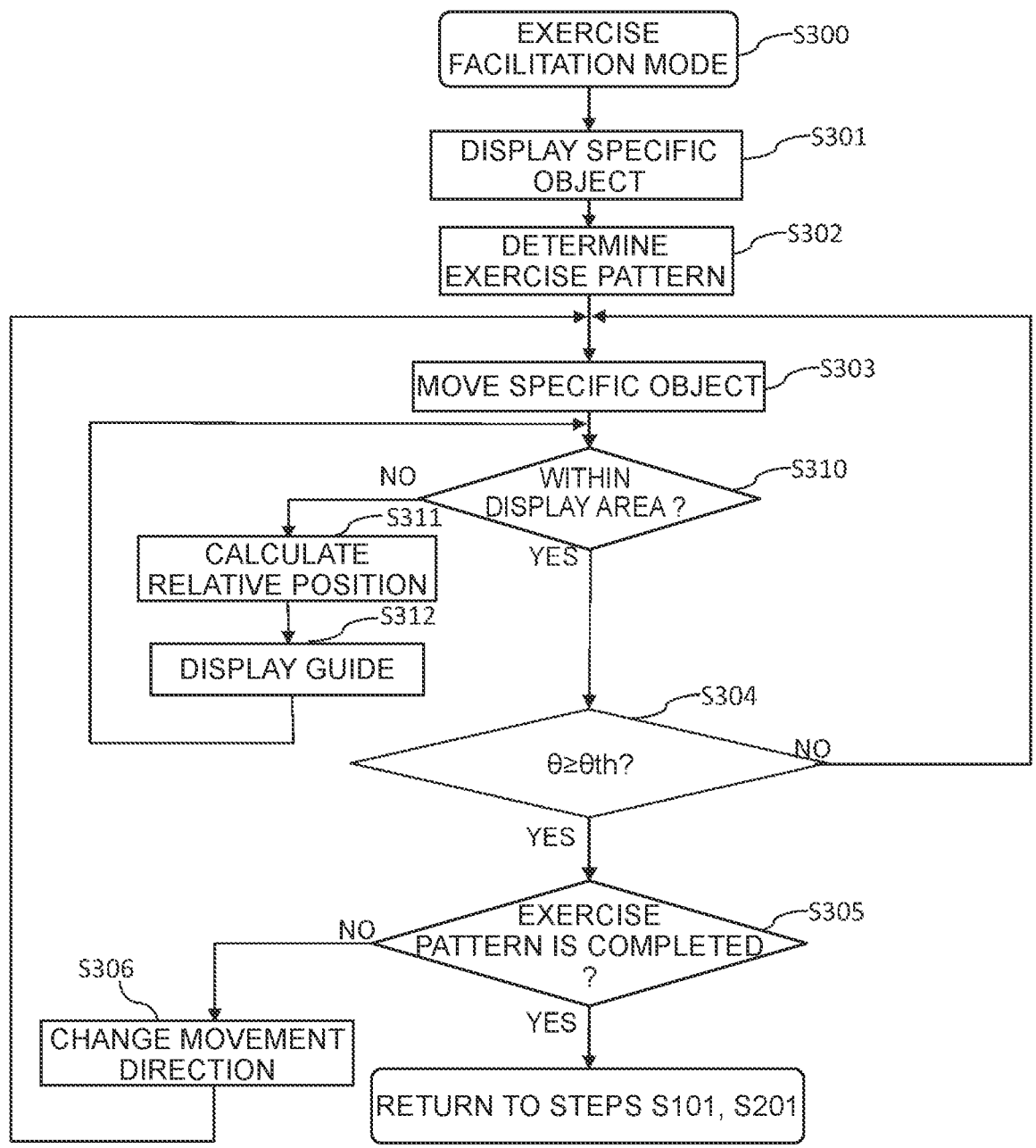
FIG. 15 is a flowchart illustrating a processing flow of the third embodiment.

For example, the exercise facilitation unit 36 displays a guide 130 for notifying the direction of the specific object 120. FIG. 15 is a flowchart illustrating a processing flow of the third embodiment, which is the processing of notifying a direction of a specific object. The same processes as those in FIG. 5 are provided with the same reference signs, and explanation therefor will be omitted. In step S310, the exercise facilitation unit 36 determines whether the specific object is within the display area 100. If the specific object 120 is within the display area 100, the processing proceeds to step S304, however, if the specific object 120 is not within the display area 100, the exercise facilitation unit 36 calculates a relative position between the specific object 120 and the display area 100 in step S311. Next, in step S312, the exercise facilitation unit 36 displays, as illustrated in FIG. 14, the guide 130 which is movement assist information showing the movement for the direction in which the head should be moved.

Furthermore, the exercise facilitation unit 36 may be configured to rearrange the specific object 120 to be within the display area 100, and move the rearranged specific object 120 again in a direction in which the wearer 2 should face. In this case, the exercise facilitation unit 36 determines that the wearer 2 could not follow the speed of movement of the specific object 120, and accordingly, may set the speed less than the speed of the initial movement so that the wearer 2 can follow the specific object 120 more easily.

Still further, the exercise facilitation unit 36 may be configured to notify the direction using the sound from the speaker 82 provided on the HMD 1. In the case where the speaker 82 is a three-dimensional speaker that allows the wearer 2 to recognize the direction of the sound source, the exercise facilitation unit 36 may notify the wearer 2 of the position of the specific object 120 by emitting the sound from the direction of the specific object 120.

According to the present embodiment, even when the wearer 2 loses track of the specific object 120, the wearer 2 is notified with the movement direction of the specific object 120 by the guide 130. This enables the wearer 2 to find the specific object 120, and thus do the exercise for recovery from fatigue.

Fourth Embodiment

The fourth embodiment is an embodiment for facilitating recovery from fatigue of the eyeballs of the wearer 2. In the fourth embodiment, the in-camera 71 captures images of the eye of the wearer 2. Then, the exercise amount monitoring unit 35 detects the movement of the point of view of the wearer 2 based on the images captured by the in-camera 71. Within a period of time in which to decide whether the exercise for recovery from fatigue is necessary, the exercise amount monitoring unit 35 determines whether a cumulative value Meye of the movement of the point of view of the wearer 2 is equal to or less than an exercise facilitation threshold value Meyeth which is predetermined for the movement of the point of view.

When Meye is equal to or less than Meyeth, the exercise facilitation unit 36 generates the specific object 120 and moves the display position thereof. A moving range of the display position may be kept within the display area 100 since it is sufficient that a point-of-view exercise can be performed therein.

Since the point of view of the wearer 2 moves less from the display position of the content while the wearer 2 is viewing the content, the eyes of the wearer 2 may be fatigued. According to the present embodiment, the in-camera 71 is used to track the movement of the point of view of the wearer 2 so as to facilitate the exercise for recovery from fatigue of the eyeballs as necessary, whereby the reduction of the eyestrain of the wearer 2 can be expected.

Furthermore, the exercise facilitation unit 36 may move the specific object 120 in a direction away from the body of the wearer 2 to make the wearer 2 walk or extend his or her hands as the exercise for recovery from fatigue. For example, the exercise facilitation unit 36 may use the virtual object 113 of the cup illustrated in FIG. 6(*a*) as a specific object, and provide the wearer 2 with a sound guidance to cause the wearer 2 to hold the virtual object 113. Thus, the wearer 2 is made to exercise by moving the head to see the virtual object 113 that was not visualized at the time of hearing the sound guide and extending the hand toward the virtual object 113. In addition, the exercise facilitation unit 36 may provide the wearer 2 with a sound guide to cause the wearer 2 to catch the specific object 120 shaped like a fairy, which makes the wearer 2 stand up and walk.

Fifth Embodiment

[Determination of Shift to Exercise Facilitation Mode]

Depending on the situation of the wearer 2, there are cases that shifting to the exercise facilitation mode is not appropriate. In the fifth embodiment, whether shifting to the exercise facilitation mode is appropriate is determined.

Figure 16:
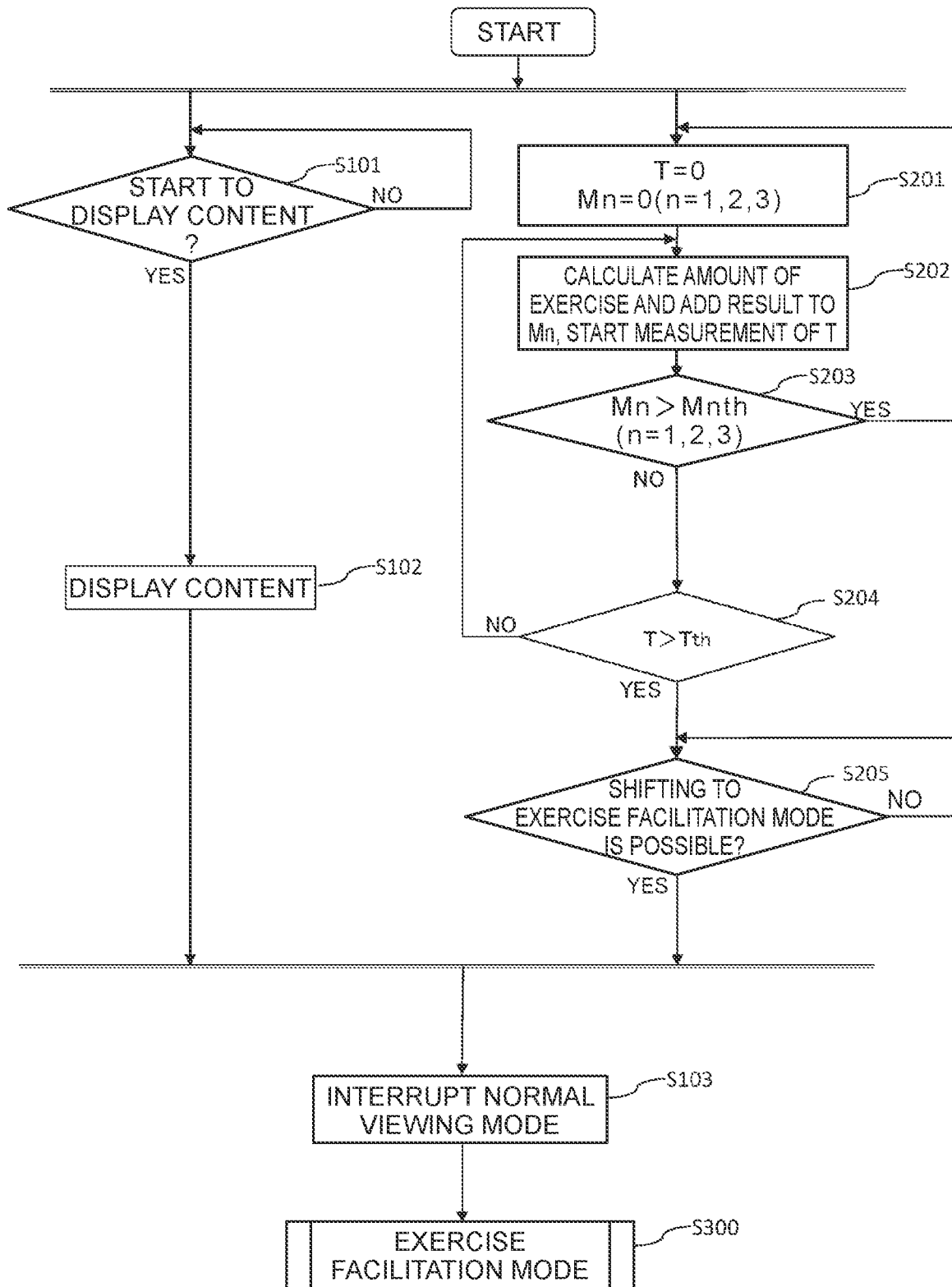
FIG. 16 is a flowchart illustrating a processing flow of the fifth embodiment.

FIG. 16 is a flowchart illustrating a processing flow of the fifth embodiment.

When the determination in step S204 is positive, the exercise amount monitoring unit 35 acquires at least one of the sensor information, the external image, or the audio data from at least one of the various sensors, the out-camera 72, or the microphone 81 to determine the situation of the wearer 2.

For example, when determining that the wearer 2 is in motion based on the sensor information from the GPS receiver 51 and the acceleration sensor 54, the exercise amount monitoring unit 35 does not shift the mode to the exercise facilitation mode since the exercise for recovery from fatigue may put the wearer 2 in danger, and thus continues the normal viewing mode and the situation determination processing (step S205: NO).

Furthermore, for example, when determining that the wearer 2 is in conversion with someone based on the external image from the out-camera 72 or the audio data from the microphone 81, the exercise amount monitoring unit 35 does not shift the mode to the exercise facilitation mode since it is an inappropriate timing to facilitate the exercise for recovery from fatigue, and thus continues the normal viewing mode and the situation determination processing (step S205: NO).

When the situation which has been determined as being inappropriate is eliminated (step S205: YES), the exercise amount monitoring unit 35 shifts the mode to the exercise facilitation mode.

According to the present embodiment, the exercise amount monitoring unit 35 determines the situation of the wearer 2, and starts the exercise facilitation mode by the exercise facilitation unit 36 only when the situation is appropriate. Thus, the exercise for recovery from fatigue can be facilitated under the situation where there is no problem if the wearer 2 does the exercise for recovery from fatigue.

In the above, the embodiment additionally including the determination processing of whether shifting to the exercise facilitation mode is possible has been described. On the other hand, for example, the wearer 2 may use the button switch 91 or the touch screen 92 to avoid the shifting to the exercise facilitation mode.

Sixth Embodiment

The sixth embodiment is an embodiment in which the present invention is applied to a mobile video display device other than the HMD 1, for example, a smartphone 210 or a tablet device.

Figure 17A:
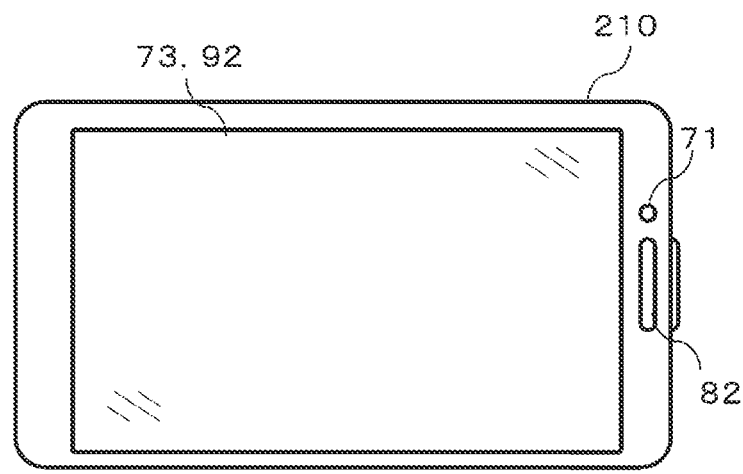
FIG. 17A illustrates the front surface of a smartphone.
Figure 17B:
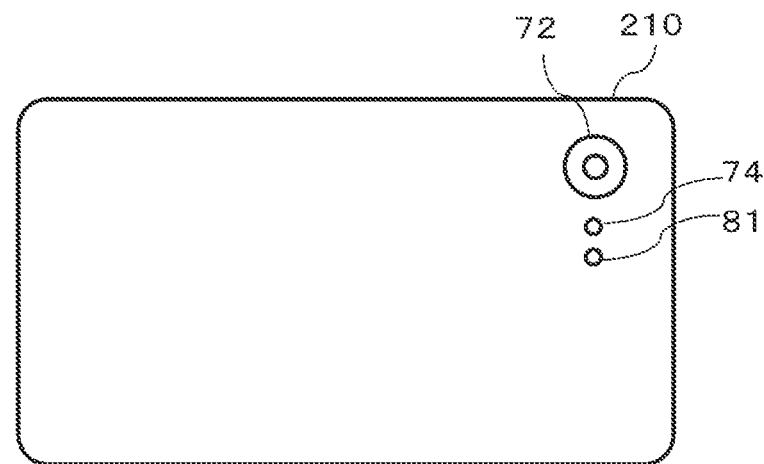
FIG. 17B illustrates the back surface of a smartphone.

FIG. 17A illustrates the front surface of the smartphone 210, and FIG. 17B illustrates the back surface of the smartphone 210.

On the front surface of the smartphone 210, the display 73 equipped with the touch screen 92, the in-camera 71 capable of taking a selfie, and the speaker 82 are provided. On the back surface of the smartphone 210, the out-camera 72, a photographing light 74 such as an LED, and the microphone 81 are provided. Inside the housing of the smartphone 210, in the same manner as the HMD 1, various sensors are provided to detect the orientation of the body of the smartphone 210. In addition, although not illustrated, a range sensor used in the three-dimensional authentication of the face of the wearer 2 may be arranged on the front surface of the smartphone 210, and furthermore, a range sensor used to detect the distance to the subject or the shape of the subject may be arranged on the back surface.

Figure 18:
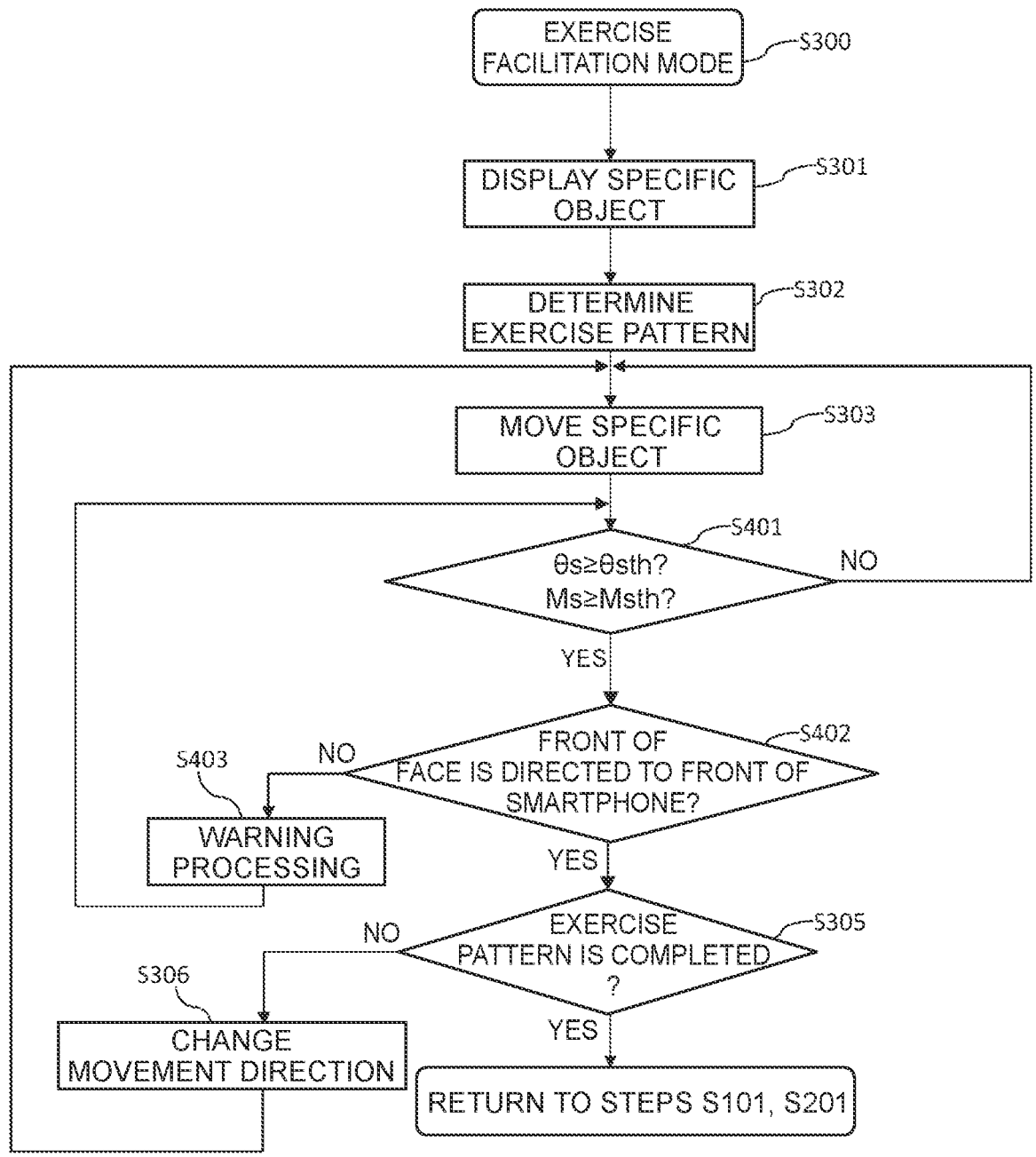
FIG. 18 is a flowchart illustrating a processing flow of the sixth embodiment.

FIG. 18 is a flowchart illustrating a processing flow according to the sixth embodiment. The processing according to the sixth embodiment differs from the processing according to the first embodiment in that, after moving the display position of the specific object 120 in step S303, the exercise facilitation unit 36 analyzes the movement direction of the smartphone 210, and compares at least one of an inclination θs of the smartphone 210 and the amount of movement Ms thereof with predetermined threshold values θsth and Msth (step S401). If the inclination or amount of movement of the smartphone 210 is less than the movement determination threshold values (step S401: NO), the position of the smartphone 210 relative to the position of the wearer 2 corresponds to the movement only within the movement determination threshold value. This causes the exercise facilitation unit 36 to determine that the wearer 2 is following the specific object 120 with the eyes, and accordingly, the processing returns to step S303 and the exercise facilitation unit 36 continues moving the display position of the specific object 120.

When determining that the inclination or amount of movement of the smartphone 210 is equal to or more than the movement determination threshold values (step S401: YES), the exercise facilitation unit 36 determines whether the wearer 2 is correctly facing the smartphone 210 (step S402). In the case of the smartphone 210, unlike the case of the HMD 1, the movement of the smartphone 210 does not match the movement of the head of the wearer 2, and accordingly, it is necessary to determine whether the head of the wearer 2 is in motion.

The exercise facilitation unit 36 causes the in-camera 71 to capture an image of the face of the wearer 2 to determine the orientation of the face. The exercise facilitation unit 36 causes the in-camera 71 to capture the image of the front of the face of the wearer 2, for example, before start of the exercise processing or during viewing of the content, and compares the image of the front of the face of the wearer 2 with the image of the face of the wearer 2 captured during the exercise processing so as to determine whether the front of the face of the wearer 2 is directed to the front of the smartphone 210.

When determining that the orientation of the face of the wearer 2 is directed to the front of the smartphone 210 (step S402: YES), the exercise facilitation unit 36 determines whether the exercise pattern is completed (step S305), and if it is completed, shifts the mode to the normal viewing mode and the exercise amount monitoring mode.

On the other hand, when determining that the orientation of the face of the wearer 2 is not directed to the front of the smartphone 210 (step S402: NO), the exercise facilitation unit 36 performs warning processing (step S403). In the warning processing, for example, attention to prompt the wearer 2 to move the head is displayed in the display area 100, or sound is used to prompt the wearer 2 to move the head.

Figure 19:
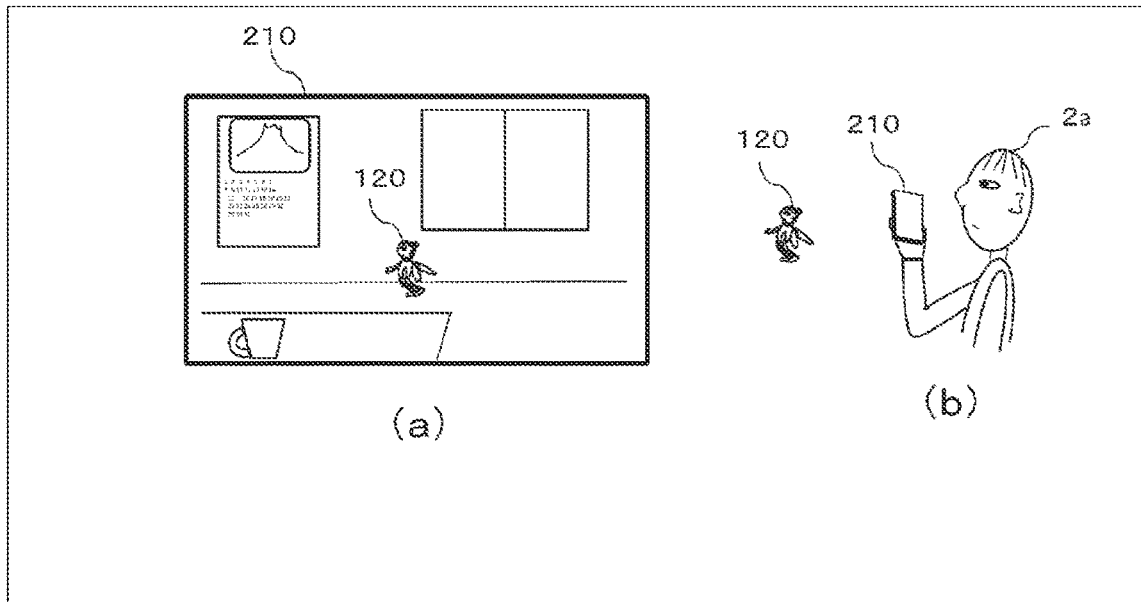
FIG. 19 illustrates a case where the face of a wearer is directed to the front of a smartphone.

FIG. 19 illustrates the case where the front of the face of the wearer 2 is directed to the front of the smartphone 210. FIG. 19(a) illustrates the image displayed within the display area 100 of the smartphone 210, and at this time, the front of the face of the wearer 2 is directed to the display area 100 of the smartphone 210 as illustrated in FIG. 19(b). In FIG. 19(a), the specific object 120 is within the screen, and the smartphone 210 is also directed toward a predetermined direction.

Figure 20:
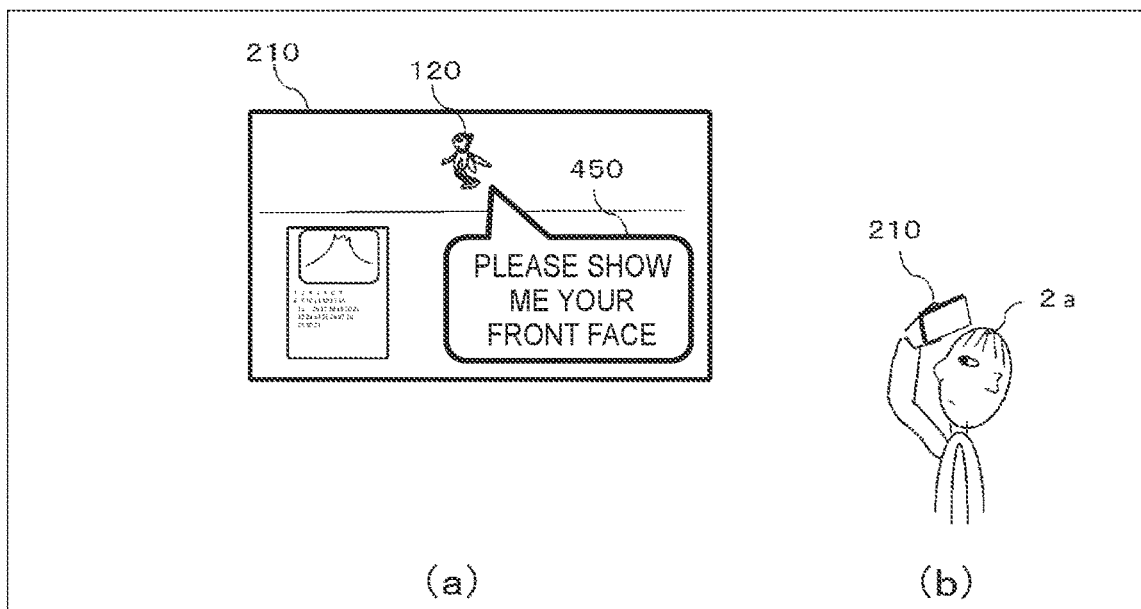
FIG. 20 illustrates a case where the face of a wearer is not directed to the front of a smartphone.

FIG. 20 illustrates the case where the face of the wearer 2 is not directed to the front of the smartphone 210. In FIG. 20(b), the face of the wearer 2 is not directed to the front of the smartphone 210, and thus it is not determined that the wearer 2 is properly doing the exercise. In this case, as illustrated in FIG. 20(a), a warning display 450 is displayed.

Furthermore, steps S401 to S403 are repeated until the smartphone 210 and the orientation of the face of the wearer 2 reach predetermined positions, and then the processing proceeds to step S305 of determining whether the exercise pattern is completed.

According to the present embodiment, even in the case of a portable video information device such as the smartphone 210 whose movement does not match the movement of the head, it is possible to facilitate the exercise for recovery from fatigue every certain period of time and to confirm whether the exercise for recovery from fatigue is correctly done.

In the embodiment above, instead of the in-camera 71, a range sensor arranged on the front surface of the smartphone 210 may be used to detect the orientation of the face based on the position of the eyes, nose, or mouth of the wearer 2, and determine the positional relation between the face of the wearer 2 and the smartphone 210 based on the detected information.

Each of the embodiments above are an example of an embodiment of the present invention. The present invention is not limited to the embodiments above, and various modifications are possible. For example, a part of an exemplary embodiment may be replaced with a part of other embodiments, and a part of other embodiments may be added to the exemplary embodiment. These modifications belong to the scope of the present invention. Furthermore, the numerical values, messages, and the like appearing in the description and drawings are merely examples, and the effect of the present invention is not impaired even if different ones are used.

A part of or all of the functions and the like of the present invention described above may be implemented by hardware, for example, by designing it by an integrated circuitry. Alternatively, a microprocessor unit or the like may interpret and execute a program for implementing each function or the like, thereby implementing it by software. Hardware and software may be used together. The software may be stored in advance in a program unit of an HMD, a mobile video display device, or the like at the time of product shipment. The software may be acquired from various servers or the like on the Internet after the product is shipped. Furthermore, the software which is provided in a memory card, an optical disk, or the like may be acquired.

Furthermore, the control lines and information lines which are considered to be necessary for the purpose of explanation are indicated herein, but not all the control lines and information lines of actual products are necessarily indicated. It may be considered that almost all the configurations are actually connected to each other.

REFERENCE SIGNS LIST

1: HMD
2: wearer
2a: viewer
3: system bus
20: main processor
30: main controller
31: sensor information acquisition unit
32: sensor information storage unit
33: exercise amount analysis unit
34: exercise amount information storage unit
35: exercise amount monitoring unit
36: exercise facilitation unit
41: RAM
42: ROM
43: flash memory
51: GPS receiver
52: geomagnetic sensor (exercise amount detection sensor)
53: range sensor
54: acceleration sensor (exercise amount detection sensor)

55: gyro sensor (exercise amount detection sensor)
56: timer
61: wireless communication I/F
62: telephone network communication I/F
71: in-camera
72: out-camera
73: display
74: photographing light
81: microphone
82: speaker
83: audio decoder
91: button switch
92: touch screen
100: display area
101: three-dimensional space
111: content
112: table
113: virtual object
120: specific object
120_out: specific object
121: specific object
130: guide
210: smartphone
450: warning display

The invention claimed is:

1. A video display device comprising;
a display;
an exercise amount detection sensor configured to detect an amount of exercise of the video display device while content displayed on the display is viewed, and output sensor information;
a timer that measures a viewing time of the content; and
a processor connected to the display, the exercise amount detection sensor, and the timer, respectively,
the processor being configured to:
acquire the viewing time from the timer;
calculate the amount of exercise of the video display device based on the sensor information acquired within a predetermined period of viewing time;
compare the amount of exercise with an exercise facilitation threshold value for determining whether to facilitate an exercise to a viewer;
display a specific object within a display area of the display when the amount of exercise is equal to or less than the exercise facilitation threshold value, a display position of the specific object being defined by a coordinate system in which a two-dimensional coordinate system expressing a position of a pixel in the display area of the display is associated with an external coordinate system expressing a position in a real space; and
move the display position of the specific object from an inside of the display area to an outside thereof in accordance with the external coordinate system.

2. The video display device according to claim 1, wherein the processor is configured to notify a direction in which the video display device is to be moved so that the specific object is visualized when the specific object is outside the display area.

3. The video display device according to claim 1, wherein the processor is configured to:
acquire the sensor information output from the exercise amount detection sensor after displaying the specific object, and calculate the amount of exercise after displaying the specific object; and
compare the amount of exercise after displaying the specific object with an achievement threshold value for determining whether the viewer has done the exercise, and finish displaying the specific object when the amount of exercise after displaying the specific object is equal to or more than the achievement threshold value.

4. The video display device according to claim 1, wherein the processor is configured to:
determine whether the viewer is in motion based on the sensor information; and
not to display the specific object when determining that the viewer is in motion.

5. The video display device according to claim 1, further comprising at least one of a microphone and an out-camera for capturing an image of an external scenery of the video display device, wherein
the processor is configured to:
determine whether the viewer is in conversation based on at least one of audio information collected by the microphone and an external image captured by the out-camera; and
not to display the specific object when determining that the viewer is in conversation.

6. The video display device according to claim 1, wherein the video display device is a head mounted display, and the exercise amount detection sensor is at least one of a GPS receiver, a geomagnetic sensor, a range sensor, an acceleration sensor, and a gyro sensor.

7. The video display device according to claim 1, wherein the video display device is a mobile video display device, the mobile video display device further comprises an in-camera for capturing an image of the viewer who is viewing the content displayed on the display,
the processor is further connected to the in-camera, and the processer is configured to:
compare the amount of exercise after displaying the specific object with an achievement threshold value for determining whether the viewer has done the exercise, and
when determining the amount of exercise after displaying the specific object is equal to or more than the achievement threshold value, and also determining that the viewer is directly facing the display, as a result of determining whether the viewer is directly facing the display based on the image captured by the in-camera, stop to display the specific object.

8. The video display device according to claim 1, wherein the processor is configured to display the specific object formed with a virtual object.

9. The video display device according to claim 1, wherein the processor is configured to display the specific object formed with a reduced image in which a display size of the content is reduced.

10. The video display device according to claim 1, wherein
the processor is configured to:
in a case where pixels corresponding to coordinates of the external coordinate system of the display position of the specific object are present in the display area of the display, display the specific object on the pixels, and
in a case where no pixel corresponding to the coordinates of the external coordinate system of the display position of the specific object is present in the display area, not to display the specific object on the display.

11. A video display method comprising:
  displaying content on a display mounted on a video display device;
  acquiring sensor information obtained by detecting an amount of exercise of a viewer who is viewing the content displayed on the display;
  calculating the amount of exercise of the viewer based on the sensor information acquired within a predetermined period of viewing time;
  comparing the amount of exercise with an exercise facilitation threshold value for determining whether to facilitate an exercise to the viewer;
  displaying a specific object within a display area of the display when the amount of exercise is equal to or less than the exercise facilitation threshold value; and
  moving a display position of the specific object from an inside of the display area to an outside thereof in accordance with an external coordinate system expressing a position in a real space, wherein the display position of the specific object is defined by a coordinate system in which a two-dimensional coordinate system expressing a position of a pixel in the display area of the display is associated with the external coordinate system.

* * * * *